United States Patent
Boespflug et al.

(10) Patent No.: US 9,422,106 B2
(45) Date of Patent: Aug. 23, 2016

(54) WATERBORNE UNDERBODY COATING SYSTEM

(71) Applicant: Valspar Sourcing, Inc., Minneapolis, MN (US)

(72) Inventors: Donald Boespflug, Lino Lakes, MN (US); Douglas Mueller, Minneapolis, MN (US); David Fouquette, Foley, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 36 days.

(21) Appl. No.: 14/496,608

(22) Filed: Sep. 25, 2014

(65) Prior Publication Data

US 2015/0014207 A1    Jan. 15, 2015

Related U.S. Application Data

(63) Continuation of application No. PCT/US2013/030806, filed on Mar. 13, 2013.

(60) Provisional application No. 61/617,282, filed on Mar. 29, 2012.

(51) Int. Cl.
| | |
|---|---|
| *B65D 90/06* | (2006.01) |
| *C09D 195/00* | (2006.01) |
| *C08K 3/34* | (2006.01) |
| *C08K 5/01* | (2006.01) |

(52) U.S. Cl.
CPC .............. *B65D 90/06* (2013.01); *C08K 3/346* (2013.01); *C08K 5/01* (2013.01); *C09D 195/005* (2013.01); *B65D 2590/026* (2013.01); *C08L 2555/52* (2013.01)

(58) Field of Classification Search
CPC   B65D 90/06; B65D 2590/026; C08K 3/346; C08K 5/01; C09D 195/005; C08L 2555/52
USPC .............. 220/1.5, 626, 415, 560.07, 560.11; 106/14.05; 252/62; 427/426
See application file for complete search history.

(56) References Cited

U.S. PATENT DOCUMENTS

| | | | |
|---|---|---|---|
| 4,057,170 A | * | 11/1977 | Dougherty ........... B65D 90/008 220/1.5 |
| 4,197,134 A | | 4/1980 | Musilli |
| 5,713,996 A | | 2/1998 | Morris et al. |

(Continued)

OTHER PUBLICATIONS

International Search Report and Written Opinion for related case PCT/US20131030806, mailed on Jul. 8, 2013. (10 pages).

(Continued)

*Primary Examiner* — Robert J Hicks
*Assistant Examiner* — Kareen Thomas

(57) ABSTRACT

The present invention provides a water-based coating system that can be used to form a durable, abrasion resistant, tough, protective coating on a wide range of substrates, including the underbody of transport vehicles, storage units, and the like. The coating composition includes an asphaltic component and advantageously has excellent adhesion properties when coated onto metal surfaces, including the underbody of transport vehicles, storage units and the like. The coating system is particularly effective for protecting metal or metal-containing substrates forming the underbody of an intermodal cargo container. The resultant coatings are flexible and impact resistant.

11 Claims, 1 Drawing Sheet

(56) References Cited

U.S. PATENT DOCUMENTS

| | | | |
|---|---|---|---|
| 6,031,029 A | 2/2000 | Baumgardner et al. | |
| 7,491,756 B2 | 2/2009 | Hernandez et al. | |
| 2004/0196152 A1* | 10/2004 | Tice | G08B 25/10 340/539.26 |
| 2007/0187647 A1* | 8/2007 | Bruckbauer | C08L 95/00 252/388 |
| 2008/0028978 A1 | 2/2008 | Twining et al. | |
| 2008/0197649 A1* | 8/2008 | Byler | B65D 90/06 296/39.3 |
| 2010/0203281 A1 | 8/2010 | Hong et al. | |
| 2011/0281094 A1* | 11/2011 | Zanchetta | B32B 5/02 428/215 |

OTHER PUBLICATIONS

Anonymous: "Basic Asphalt Emulsion manual; MS-19; 4th Edition" In: "Basic Asphalt Emulsion manual; MS-19; 4th Edition", Feb. 1, 2008, Asphalt Institute, Lexington, Kentucky;USA, p. i-iii,v-xi, 1-3,5-12.

Connan, J: "Use and trade of bitumen in antiquity and prehistory: molecular archaeology reveals secrets of past civilizations", Philosophical Transactions of the Royal Society B: Biological Sciences, vol. 354, No. 1379, Jan. 29, 1999, pp. 33-50.

Extended Search Report for European Application No. 13768247.2, mailed Oct. 26, 2015. 8 pages.

* cited by examiner

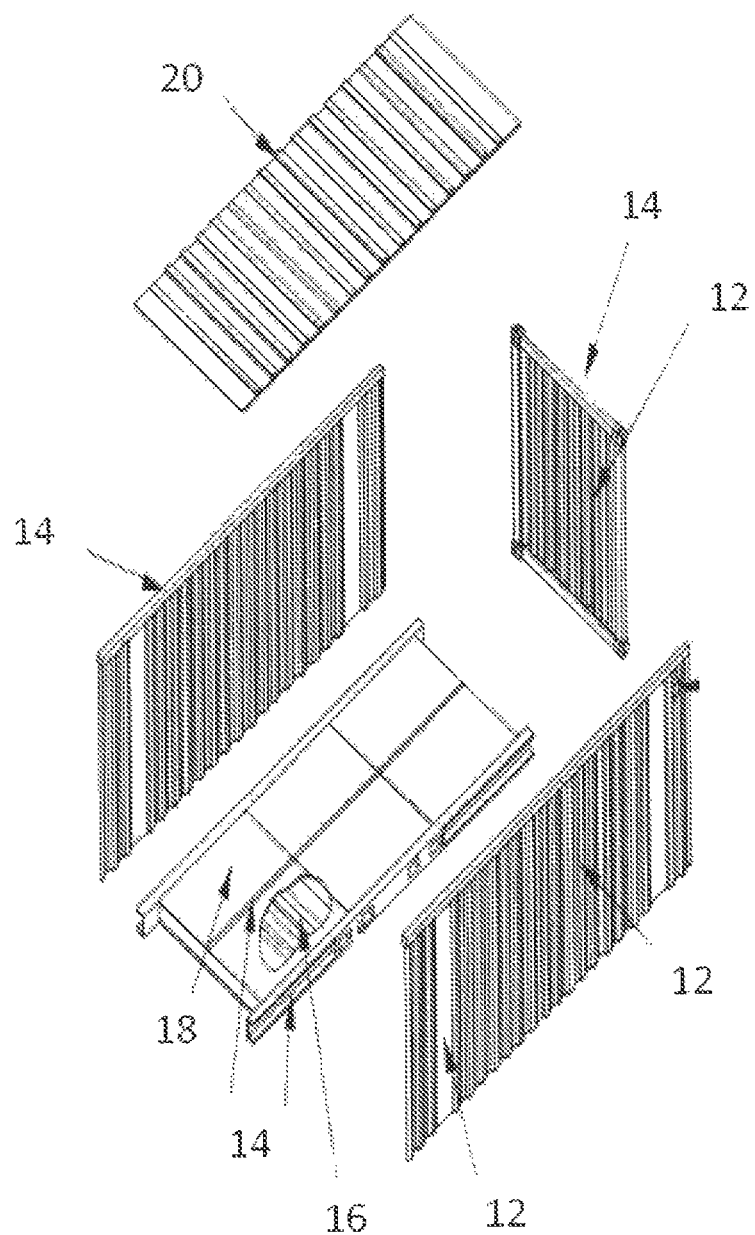

WATERBORNE UNDERBODY COATING SYSTEM

CROSS-REFERENCE TO RELATED APPLICATION(S)

This application is a continuation of International Application No. PCT/US2013/030806, filed on Mar. 13, 2013, which claims the benefit of U.S. Provisional Application No. 61/617,282 filed on Mar. 29, 2012, each of which is incorporated herein by reference in its entirety.

BACKGROUND OF THE INVENTION

Intermodal cargo containers (also referred to as freight or shipping containers) are reusable transport and storage units for moving products and raw materials between locations, including between countries. Intermodal cargo containers are standardized to facilitate intermodal transport such as among marine transport, freight train transport, and freight truck transport. Standardization of cargo containers also is referred to as containerization.

Containerization has provided global commerce with many benefits. Shipped goods move more easily and cheaply. Manufacturers know that goods loaded at one location can be readily unloaded at the destination. Cargo security has been improved, as containers are usually sealed and can be locked to discourage tampering and theft. Containers also have a longer service life, and there is a stronger market for used containers. Additionally, the costs of cargo containers themselves is lowered because a manufacturer can make these in larger volume knowing that potential customers are available all over the world.

Several international standards have been created to promote international containerization. For instance, the International Organization for Standardization (ISO) has promulgated applicable standards including R-668 to define terminology, dimensions, and ratings; R-790 to define identification markings; R-1161 to recommend corner fittings; and R-1897 to set forth dimensions for general purpose containers. Other standards include ASTM D5728-00, ISO 9897 (1997); ISO 14829 (2002); ISO 17363 (2007); ISO/PAS 17712 (2006); ISO 18185 (2007); and ISO/TS 10891 (2009). An international specification for coating/paint performance is provided by IICL (Institute of International Container Lessors). See also International Organization for Standardization (ISO), Freight Containers, Vol. 34 of ISO Standards Handbook, 4th Ed., 2006, ISBN 92-67-10426-8; and Levinson, Marc, The Box: How the Shipping Container Made the World Smaller and the World Economy Bigger, Princeton, N.J., Princeton University Press, 2006, ISBN 0691123241. Each of these standards and publications is incorporated herein in its entirety for all purposes.

Cargo containers, and especially, the container underbody, experience harsh, corrosive environments during their service life. When shipped by sea, the containers are exposed to the corrosive effects of salt water. When exposed to nature, the containers must withstand wind, sun, hail, rain, sand, heat, and the like. Containers exposed to the sun can bake to temperatures of 82° C. (180° F.) or even higher.

Accordingly, cargo containers must be made in a way that allows the containers to survive this exposure for a reasonable service life. As one strategy, containers can be made from corrosion resistant materials such as stainless steel, weathering steel (also known as weather steel, COR-TEN brand steel, or CORTEN brand steel). A typical cargo container includes a steel frame and steel wall panels welded to the frame, along with metal crossmembers forming the underbody of the container, all of which can then be protected with a waterproof barrier.

Historically, mostly solvent-based coating systems have been used to protect cargo containers as many proposed water-based systems have been unable to satisfy the applicable performance demands and/or standards. It has been very difficult to formulate water-based coating systems that show acceptable adhesion when applied directly to certain surfaces, including stainless steel. Water-based coatings also tend to have greater problems with respect to sagging, leveling, cratering, and cracking. Consequently, only solvent-based coating systems have found widespread commercial acceptance in the industry. The container industry retains a strong bias against using water-based coating systems.

With increased environmental awareness, there is a strong desire to develop improved technology that would allow use of water-based coating systems to protect cargo containers or other substrates. The industry strongly desires a commercially available, water-based coating system, including underbody coating, which is able to satisfy the stringent demands of the intermodal cargo container industry.

SUMMARY OF THE INVENTION

The underbody components of transport vehicles, storage units, and the like are often exposed to extreme environments in terms of weather exposure, salt water exposure, fresh water exposure, heat from the sun, and the like during their service lives. Moreover, the corrosion of underbody components is accelerated by significant exposure to dirt, chemicals, mud, sand and other residue during transport or storage. Therefore, protection of underbody components against abrasion, corrosion, and the like is needed.

Accordingly, in an embodiment, the present invention provides methods of coating the underbody of an intermodal cargo container. In an aspect, the invention provides a method of coating the underbody, including providing a cargo container, where at least a portion of the exposed surface of the cargo container includes an underbody of metal or metal-reinforced wood. An aqueous coating system is then applied on at least the underbody. This aqueous coating system includes an asphaltic coating composition in admixture with an aqueous carrier.

In another embodiment, the present invention provides a coated article, wherein the article includes a cargo container where at least a portion of the exposed surface of the cargo container includes an underbody of metal or metal-reinforced wood. An aqueous coating system is then applied on at least the underbody. This aqueous coating system includes an asphaltic coating composition in admixture with an aqueous carrier.

BRIEF DESCRIPTION OF THE DRAWINGS

FIG. 1 is a perspective view of a portion of an exemplary intermodal cargo container, showing a floor made of wood panels and reinforced with metal crossbars.

DETAILED DESCRIPTION OF PRESENTLY PREFERRED EMBODIMENTS

Unless otherwise specified, the following terms as used herein have the meanings provided below.

The term "component" refers to any compound that includes a particular feature or structure. Examples of components include compounds, monomers, oligomers, polymers, and organic groups contained there.

The term "substantially free" of a particular compound or component means that the compositions of the present invention contain less than 50 parts per million (ppm) of the compound. With respect to volatile organic compounds (VOC), the term "substantially free" means that a composition contains no more than 10 wt % VOC, preferably no more than 4 wt % VOC.

The term "water-dispersible" in the context of a water-dispersible polymer means that the polymer can be mixed into water (or an aqueous carrier) to form a stable mixture. For example, a mixture that separates into immiscible layers during storage or with the application of physical force is not a stable mixture. The term "water-dispersible" is intended to include the term "water-soluble." In other words, by definition, a water-soluble polymer is also considered to be a water-dispersible polymer.

The term "dispersion" in the context of a dispersible polymer refers to the mixture of a dispersible polymer and a carrier. As used herein, the term "dispersion" is intended to include the terms "solution" and "suspension."

As used herein, the term "latex" polymer means that a polymer is in admixture with an aqueous carrier, with the aid of at least one emulsifying agent to create an emulsion of polymer particles in the carrier, i.e., a dispersion or suspension of small polymer particles in a carrier in which the polymer particles would not be soluble.

Unless otherwise indicated, a reference to a "(meth) acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter.

As used herein, "aqueous" means that at least about 5 wt %, preferably at least about 20 wt %, more preferably at least about 40 wt %, and even more preferably at least about 60 wt % of the carrier, and even 90 wt % or more is water, based upon the total weight of the carrier. Most preferably, from about 85 to 100 wt %, more preferably about 95 to 99 wt % is water.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

The present invention generally includes an aqueous coating system. The aqueous coating compositions described herein are useful to form durable, abrasion resistant coatings over a wide range of substrates, including intermodal cargo containers, and specifically the underbody of the cargo container. The coating system advantageously has excellent adhesion properties and can be directly coated on various surfaces, with or without an intervening or intermediate coating layer or system. Other types of coatings can be used in combination with the coating system of the present invention if desired. The coating system is particularly effective for protecting metal or metal-containing substrates such as the materials used to make the underbody of intermodal cargo containers. The resultant coatings are flexible and impact resistant. Being water-based, the coating compositions have lower VOC emissions and less residual odor than solvent-based compositions.

In an embodiment, the present invention provides a method of coating an intermodal cargo container, specifically the underbody of the container. An intermodal cargo container, also known as a shipping container or freight container, is a reusable storage and/or transport unit of standard dimension. A typical container has two sidewalls, a roof, a back panel and a front panel. A door is typically fitted into the front panel of the container. The container is typically made of corrosion-resistant materials, including stainless steel, preferably corrugated weathering steel (also known as weather steel or COR-TEN steel).

In an embodiment, the container includes a sixth side that makes up the container floor, i.e. a load-bearing planar structure on which cargo is placed for storage and/or transport. In an aspect, cargo is preferably placed on an upper major surface of the floor, with the lower major surface representing the underside of the floor. In an aspect, the floor may be constructed of various materials that provide sufficient load-bearing capacity. Suitable materials include welded steel, aluminum, sandwich-structured composites, wood, and the like. In an aspect, wood or wood composite materials are preferred, including for example, wood composite, wood planking, such as hardwood planking, for example, plywood sheets, preferably birch plywood or marine plywood, for example, and the like. The wood or wood composite is preferably reinforced to improve load-bearing capacity and improve durability of the floor.

In an embodiment, the container floor is preferably reinforced with metal. In an aspect, the metal reinforcement is provided by a series of crossmembers, which are lateral structural members attached to the bottom rail of the container sidewall, and preferably in a manner as to provide support to the floor bottom, specifically the underside of the floor.

The aqueous coating composition described herein provides water-based underbody coatings with the underlying primer coatings and also with uncoated substrates such as bare stainless steel. The aqueous coating compositions may be applied directly onto stainless steel surfaces such as muffler grade stainless steel, for example, and also onto other materials comprising the underbody. Significantly, the aqueous coating composition described herein shows excellent resistance to blistering, less peeling, great durability and excellent adhesion to the coated or uncoated metal surfaces to which it is applied. This makes the compositions very useful for directly coating stainless steel surfaces, and especially metal surfaces of the underbody of intermodal cargo containers.

The advantages of the present invention are provided by an aqueous coating composition comprising an asphaltic component as part of an emulsion. Desirably, the emulsion either is film forming on its own or can be caused to be film forming, such as if the emulsion were used in combination with coalescing aid(s), heat, and/or the like. The emulsions are used in combination with one or more mineral filler components that cumulatively are present in significant amounts as described further below. The filler content helps to provide improved adhesion as well as improved application characteristics. The fillers also may serve other functions in the coating. By way of example, fillers may serve as thickeners or rheology modifiers.

The aqueous coating composition of the invention may be a single phase solution in which one or more ingredients including at least the asphalt component are substantially fully dissolved in an aqueous carrier. Alternatively, the coating composition may include two or more phases. Compositions including two or more phases may be in the form of dispersions such as a dispersion in which one or more phases are dispersed in a continuous phase of another material and/or phase. Many dispersions are in the form of suspensions including but not limited to colloidal suspensions. In some embodiments, the coating composition is in the form of a latex or emulsion including, for example, asphalt particles or microparticles dispersed in an aqueous carrier. Some compositions may be water-reducible meaning that the composition remains stable if diluted with additional amounts of water. External acids or bases may be required for anionic stabilization, but such acids and bases usually are different than the emulsifying agents (e.g., surfactants) that are used to disperse a latex polymer.

In an embodiment, the aqueous coating composition described herein includes an asphalt component, preferably an asphalt emulsion. The asphalt emulsion includes a particle aggregate of neat asphalt or bitumen, obtained from coal tar, petroleum, pitch and other known sources of asphalt. In an aspect, the asphalt is in the form of highly sheared droplets dispersed in water. Without being bound to theory, it is believed that the distribution of particle sizes of the asphaltic droplets within the emulsion influences the viscosity of the emulsion, i.e. larger average particle sizes produce emulsions with lower viscosity, and smaller average particle sizes provide improved application properties for the emulsion. Therefore, in an embodiment, the droplets of asphalt in the emulsion have diameter in the range of preferably about 0.05 to 0.25 µm, more preferably 0.1 to 0.2 µm.

The amount of the asphaltic component in the aqueous coating composition may be selected from a wide range. Generally, if the amount of asphalt is too low, then it may be difficult to form a film that has sufficient adhesion to the substrate, or the film may have insufficient corrosion resistance or other performance, and/or the like. If too much asphalt is used, it may be harder to formulate an effective coating system or it may be more difficult to make an asphaltic coating that can be applied to the substrate. Balancing such concerns, the aqueous coating composition preferably includes from about 10 to 70 wt %, more preferably about 15 to 50 wt %, and most preferably about 20 to 40 wt % of the asphaltic component based on the total weight of the aqueous coating composition.

Typical asphaltic emulsions are unstable, and tend to separate into asphalt and water. Without being bound to theory, this may be attributed to asphalt being insoluble in water. Over time, the sheared droplets of asphalt will fuse or coalesce and the emulsion will break down, leading to phase separation or skin formation that prevents cure of the composition after application. To prevent the emulsion from deteriorating, the emulsion is optionally and preferably stabilized by one or more anionic, cationic or nonionic stabilizing agents or emulsifiers, used either alone or in combination. Suitable emulsifiers for use in the aqueous composition described herein are known to persons of ordinary skill in the art or can be determined using standard methods. The selection of emulsifiers or stabilizers depends on the desired viscosity and performance requirements of the coating composition. In an aspect, the aqueous coating composition described herein includes up to about 15 wt %, more preferably about 5 to 10 wt %, and most preferably about 7 to 8 wt % of a stabilizer or emulsifier based on the total weight of the coating composition.

For the aqueous composition described herein, where an emulsifier or stabilizer is used, cationic emulsifiers or stabilizers are preferred. Examples of suitable cationic emulsifiers include, without limitation, acid salts of primary, secondary and tertiary amines, quarternary ammonium salts, alkyl-substituted amines and amine oxides of long chain fatty acids, N-alkyl trimethylene diamines, N-alkyl dimethyl ammonium chloride, N-alkyl trimethyl ammonium chloride, polyethoxylated alkyl amines, reaction products of primary fatty amine and ethylene oxide, polyvinylpyrollidone, and the like. Amines and quarternary ammonium salts, such as the REDICOTE (AkzoNobel) series of compounds, for example, are preferred for use with the asphaltic compositions described herein.

Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, lithium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin (C14-C16) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

Examples of suitable nonionic emulsifiers include, without limitation, tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20) ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether.

The asphalt emulsions described herein may be further stabilized or modified by the addition of one or more filler materials. Fillers are added for a variety of reasons, including thickening properties and improved sag resistance. In addition, fillers also provide improved application properties to the coating composition. Without being bound to theory, it is believed that fillers extend the softening range of the asphaltic component, allowing for uniform coating at typical application temperatures, and allowing a cured coating to maintain flexibility while providing barrier protection to the asphalt from weather and chemical damage, for example. In an aspect, the aqueous coating composition described herein includes about 10 to 50 wt %, preferably 15 to 45 wt %, more preferably about 20 to 40 wt %, and most preferably about 25 to 35 wt % of filler material based on the total weight of the coating composition.

Suitable fillers for use with the aqueous coating composition described herein include inert fillers or colloidal mineral suspensions, collectively termed "mineral fillers" herein. Examples of such mineral fillers include, without limitation, finely ground silica, talc, slate, BaSO4, clay-type materials including Fuller's earth, bentonite, powdered contact clay, combinations of these, and the like. In an aspect, the mineral fillers may be combined with other additives, including, for example, mineral oil, including hydrotreated or petroleum-derived mineral oils. The clay-type materials are preferred, with bentonite more preferred for use with the aqueous composition described herein.

In an embodiment, the asphaltic component is in admixture with in an aqueous fluid carrier, with water the preferred aqueous carrier. In an aspect, the aqueous carrier is present at about 15 to 65 wt %, preferably 20 to 60 wt %, more preferably 25 to 55 wt %, and most preferably 30 to 50 wt %, based on the total weight of the composition.

In addition to water, the aqueous carrier of the aqueous coating composition optionally may include one or more additional, optional co-carriers. Co-carrier(s) may be used for a variety of purposes, including helping in film formation and/or paint stability. Examples of suitable co-carriers include butyl cellosolve, alcohol(s), such as butanol, coalescing agents (e.g., ester alcohol(s), such as the Eastman Texanol product and/or low VOC coalescents such as those described in U.S. Pat. Nos. 6,762,230 and 7,812,079), glycol ether(s), combinations of these, and the like. Desirably, so-called VOC-exempt co-carrier(s) are preferred.

A wide variety of other additional ingredients optionally may be included in the aqueous coating composition if desired. Examples of these include one or more defoaming aids, grinding aids, wetting agents, surfactants, coalescing aids, processing aids, skid resistance agents, abrasion resistance agents, conductive agents, antistatic agents, coloring agents, anticorrosion aids, thickeners, sag resistant agents, plasticizers, antioxidants, ultraviolet stabilizers, biocides, fungicides, fillers, combinations of these, and the like. These can be used in accordance with conventional practices currently known or hereafter developed.

The aqueous coating composition described herein can be made using a variety of techniques known to those of skill in the art.

The method of the present invention can be used to coat a wide variety of substrates, including the underbody of a wide variety of storage units, transportations vehicles and the like. Exemplary substrates include natural and building materials, trucks, railcars, freight containers, flooring materials, walls, furniture, other building materials, motor vehicle components, aircraft components, marine components, machinery components, laminates, equipment components, appliances, packaging, and the like. Exemplary substrate materials include metals, metal alloys, intermetallic compositions, metal-containing composites, combinations of these, and the like. The coating compositions can be applied on new substrates or can be used to refurbish old substrates.

The coating compositions of the invention may be applied to substrates in a variety of ways. According to one illustrative mode of practice, a substrate to be coated is provided. The substrate may be bare or may be at least partially coated with a previous coating system. In an aspect, the previous coating system is preferably a waterbased coating composition, including a corrosion-resistant primer composition. In an aspect, the primer composition preferably includes a first resin component in admixture with an aqueous carrier, and one or more fillers. Suitable compositions of this type include, for example, the waterbased primer composition described in PCT/US2011/057040, filed 20 Oct. 2011.

It may be desirable to clean the substrate to remove grease, dirt, and other contaminants. Pre-existing coatings may or may not be removed as well, depending upon the context. When the substrate is ready, the aqueous coating composition described herein is applied to at least a portion of the substrate surface and allowed to dry. One or more additional coats of the aqueous coating composition can be applied if desired. Often, a single coating is suitable.

The coating compositions of the present invention may be used to form underbody coatings having a wide range of thicknesses. Typically and preferably, the coating is applied at a medium thickness or film build. In illustrative embodiments, the coatings have a thickness in the range preferably from about 200 micrometers to about 800 micrometers, more preferably about 300 micrometers to about 700 micrometers, and most preferably about 400 micrometers to about 600 micrometers.

The coating system of the present invention is particularly suitable for forming protective coatings on the underbody of transport vehicles and storage units used in transport, including cargo containers, for example. Such vehicles and storage units, and especially the underbody components of such vehicles and units, are often exposed to extreme environments in terms of weather exposure, salt water exposure, fresh water exposure, heat from the sun, and the like during their service lives. Moreover, the corrosion of underbody components is accelerated by significant exposure to dirt, chemicals, mud, sand and other residue during transport or storage. Therefore, protection of underbody components against abrasion, corrosion, and the like is needed.

Conventionally, there has been a strong bias in the industry to only use solvent based coating systems to protect transport vehicles or storage units, especially the underbody of such vehicles and units. The bias is that water-based coatings lack the kind of performance needed to survive in this challenging environment, and the water-based coatings are difficult to apply and achieve a coating with reduced defects. Surprisingly, the present invention provides a water-based coating system that shows excellent performance when used to protect underbody components of transport vehicles or storage units.

A transport vehicle or storage unit, i.e. an intermodal cargo container 10 shown in FIG. 1. The container 10 generally includes a frame 12 that defines the top, side and bottom boundaries or side rails 14 of the container 10. The frame 12 is often made of a metal, metal alloy, intermetallic composition, metal composite, combinations of these, and the like. Due to its corrosion resistance, weathering steel often is used to make all or a portion of the frame 12. In a manner similar to aluminum, weathering steel oxidizes on the surface, but then this oxidation forms a barrier to protect the underlying steel from further corrosion.

Bottom side rails 14 are joined by cross members 16 to make up the underbody of the cargo container. The frame 12, side rails 14 and cross members 16 may be made from wide variety of metals, metal alloys, intermetallic compositions, or other metal-containing materials. In many embodiments, at least portions of the frame, rails and crossmembers are fabricated from stainless steel, as are panels mounted over and welded to the frame and rails. Panels may be made of a wide variety of materials, depending on the end use for the cargo container. For example, muffler grade stainless steel is used widely in the industry to fabricate the panels of refrigerated cargo containers.

In a typical mode of manufacture of refrigerated cargo container 10, the frame 12 is protected against corrosion such as by coating the frame 12 with a shop primer. The shop primer may be metalized zinc (galvanizing), Zn-rich primer, Zn-free, or in some embodiments, a shop primer coated with an intermediate layer of a waterbased primer composition as described in PCT/US2011/057040, filed 20 Oct. 2011.

Stainless steel wall and roof panels 20 may be welded to the frame 12 to form the sidewalls, roof panel, end wall panel, and part of the door assembly of the container 10. In addition, a panel, typically wood or wood composite, is usually placed over the crossmembers 16 to form the floor 18 of the container. The underside of the floor 18 and the crossmembers 16 together form the underbody of the container.

The aqueous coating composition described herein can be applied to the underbody of a transport vehicle or storage unit, such as a container, for example, by conventional methods known to those of skill in the art. Suitable methods include, without limitation, brushing, spraying, spin coating, roll coating, curtain coating, dipping, gravure coating, and/or the like.

Preferably, the aqueous coating composition described herein is applied to the crossmembers 16 and the underside of the floor 18 (i.e., the underbody of the container), using either airless or air-assisted airless spray techniques. Airless spray is a method of atomizing paint without the use of compressed air. The paint is pumped under high pressure to an airless spray gun, where the paint is forced at high pressure through the spray tip at the front of the gun. Airless spray allows for increased speed and less overlay. In air-assisted airless spraying, fluid pressure is provided by an airless pump and compressed air is introduced into the spray from an airless tip (nozzle) to improve the fineness of atomization. Although airless spray application is not preferred for waterbased coatings (because of air entrapment and subsequent pinholing of the film), the coating composition described herein can be easily applied using airless spray application without significant pinholing.

In an aspect, the aqueous coating composition described herein is applied to the container underbody by airless application, at a pump ratio of preferably at least 15:1, and application temperature of about 10° C. to 50° C., preferably 20° C. to 40° C.

The resultant coating of the present invention shows excellent adhesion to both primed and unprimed metal surfaces. Thus, the present invention is particularly advantageous for forming protective underbody coatings without the need for an intermediate protective layer or primer layer on the metal surface. The fact that the present invention achieves this adhesion with a water-based composition is particularly advantageous and unexpected, as even conventional solvent-based coating systems have had adhesion issues with respect to metal surfaces, especially with regard to underbody surfaces.

The present invention will now be described with reference to the following illustrative examples.

EXAMPLE 1

Waterborne Underbody Coating

In some embodiments, the underbody coating system described herein provides excellent corrosion resistance. These properties can be tested in various ways. Unless otherwise indicated, the following tests were used in the Examples that follow.

Two different asphaltic coating compositions are provided, with weight percentage (based on the total weight of the composition) of each ingredient in the composition indicated in Table 1:

TABLE 1

| Ingredient | Composition #1 | Composition #2 |
|---|---|---|
| Asphalt cement | 30% | 50% |
| Clay | 25% | 4% |
| Surfactant | — | 8% |
| Mineral oil | — | 3% |
| Water | 45% | 45% |

EXAMPLE 2

Salt Spray Testing

Panels of metal substrates (cold rolled steel or coarse-blasted metal) are sprayed with either Composition #1 or Composition #2, to a coating thickness of about 20 mil (0.5 mm). The coating on each panel is allowed to dry, and coated panels are then tested for adhesion and corrosion resistance using the tests described below.

Salt spray testing is a standardized method to determine corrosion resistance of coatings applied to metal substrates. The test is conducted in a salt spray cabinet, where a salted solution (typically 5% NaCl) is atomized and sprayed on to the surface of a test panel to which the coating composition of the invention is applied, with lines scribed on the panel. The scribed panel is thus maintained in a salt fog that duplicates a highly corrosive environment over specific periods of time, i.e., 500 hours, 1000 hours and 1500 hours. Test parameters are used according to ASTM B117 (Standard Practice for Operating Salt Fog Apparatus).

Panels subjected to salt spray testing are then analyzed for corrosion resistance by visual observation of corrosion or rust formation around the scribed lines on the panel, and by adhesion testing using a portable adhesion tester used according to ASTM D454 Method D (Pull-Off Strength of Coatings Using Portable Adhesion Testers). Results are shown in Table 2, where "pass" for salt spray testing indicates lack of observable corrosion and/or rust around the scribe lines on the test panel.

TABLE 2

| Composition | Salt Spray Testing | | | Adhesion Testing* | | |
|---|---|---|---|---|---|---|
| | 500 h | 1000 h | 1500 h | 500 h | 1000 h | 1500 h |
| #1 | pass | pass | pass | 261 | 330 | 294 |
| #2 | pass | pass | pass | 201 | 195 | 187 |

*Initial adhesion prior to salt spray exposure: Coating #1 = 298; Coating #2 = 335

Composition #1 showed good resistance to corrosion under salt spray testing conditions. After 1500 hours of exposure, no significant corrosion was seen in the area around the scribed lines. On removal of the coating, a light coating of red rust is seen on the entire surface of the metal panel, suggesting that the mode of failure is cohesive. Adhesion results were consistent with cohesive failure.

Composition #2 also showed good resistance to corrosion under salt spray testing conditions. After 1500 hours of exposure, no significant corrosion was seen in the area around scribed lines. On removal of the coating, no significant corrosion was observed on the surface of the metal panel. Adhesion results showed loss of adhesion with increased exposure time, consistent with an adhesion failure.

The embodiments of the present invention described above are not intended to be exhaustive or to limit the invention to the precise forms disclosed in the following detailed description. Rather the embodiments are chosen and described so that others skilled in the art may appreciate and understand the principles and practices of the present invention. All patents, pending patent applications, published patent applications, and technical articles cited herein are incorporated herein by reference in their respective entireties for all purposes.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of coating a cargo container, comprising:
providing a cargo container, wherein at least a portion of an exposed surface of the cargo container comprises an underbody of metal or metal-reinforced wood; and
applying an aqueous coating system on at least the underbody, wherein the system comprises an asphaltic coating composition comprising
about 10 to 70 wt% of asphaltic particles;
about 5 to 10 wt% stabilizer;
about 10 to 50 wt% filler; and
about 15 to 65 wt% aqueous carrier.

2. A coated article, comprising:
a cargo container; wherein at least a portion of an exposed surface of the cargo container comprises an underbody of metal or metal-reinforced wood; and
an aqueous coating applied on at least the underbody, wherein the aqueous coating comprises an asphaltic coating composition comprising
about 10 to 70 wt% of asphaltic particles;
about 5 to 10 wt% stabilizer;
about 10 to 50 wt% filler; and
about 15 to 65 wt% aqueous carrier.

3. The method of claim 1, wherein the asphaltic composition comprises a dispersion of the asphaltic particles in the aqueous carrier.

4. The method of claim 1, wherein the asphaltic composition further comprises a stabilizing agent selected from the group consisting of anionic stabilizers, cationic stabilizers, and mixtures thereof.

5. The method of claim 1, wherein the asphaltic composition further comprises one or more mineral fillers selected from the group consisting of finely ground silica, talc, slate, china clay, fuller's earth, bentonite, powdered contact clay, and mixtures thereof.

6. The method of claim 1, wherein the asphaltic composition comprises
about 20 to 40 wt% of asphaltic particles;
about 5 to 10 wt% stabilizer;
about 25 to 35 wt% filler; and
about 30 to 50 wt% aqueous carrier.

7. The method of claim 1, wherein the underbody has a primer composition applied thereon.

8. The method of claim 1, wherein the asphaltic coating composition further comprises less than about 1 wt% solvent.

9. The method of claim 1, wherein the asphaltic coating composition comprises at least 40 wt% solids.

10. The method of claim 1, wherein the asphaltic coating composition has no more than about 4 wt% VOCs.

11. A cargo container made by the method of claim 1.

* * * * *